June 9, 1936.  J. M. COLBY  2,043,235
TRACK FOR THE WHEELS OF VEHICLES
Filed Nov. 15, 1934
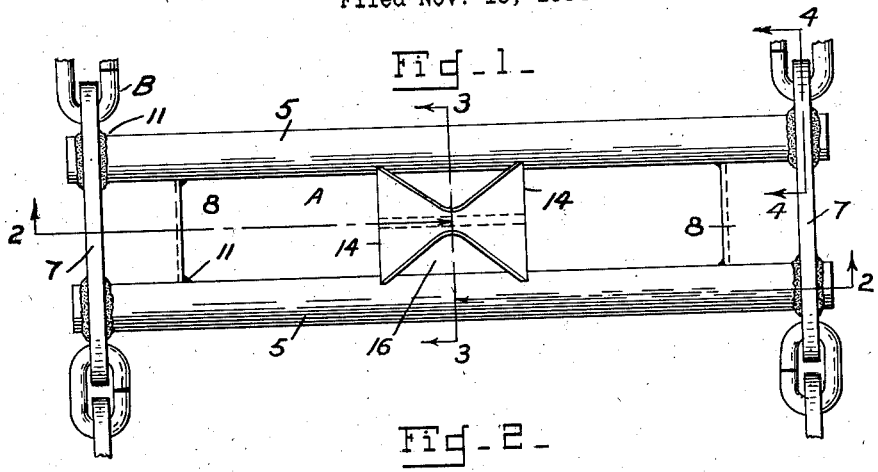
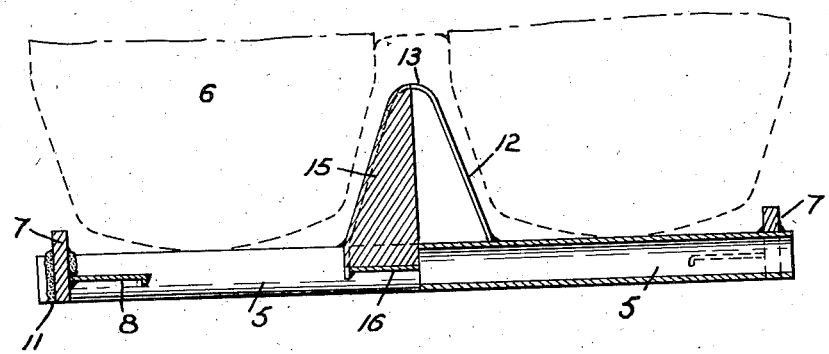
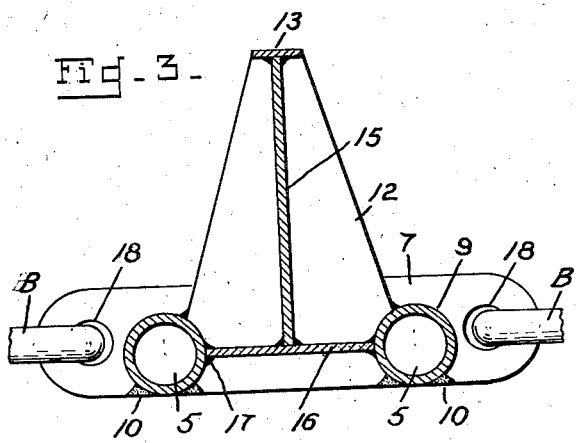
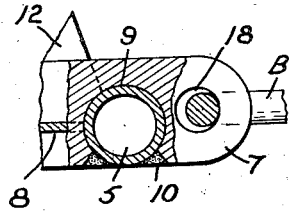
Inventor
Joseph M. Colby
By W. N. Roach
Attorney

UNITED STATES PATENT OFFICE 2,043,235

TRACK FOR THE WHEELS OF VEHICLES

Joseph M. Colby, United States Army, Watertown, Mass.

Application November 15, 1934, Serial No. 753,165

4 Claims. (Cl. 305—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a track for the wheels of a vehicle.

The purpose of the invention is to provide a simple, inexpensive track which will be of light weight and will insure positive drive between the wheel and track without creeping or slipping.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is an inside plan view of a portion of an endless track constructed in accordance with the invention.

Fig. 2 is a sectional view on the line 2—2 of Fig. 1.

Figs. 3 and 4 are sectional views on the corresponding lines of Fig. 1.

Referring to the drawing by characters of reference there is shown a portion of a chain adapted to serve as an endless track for the wheel or wheels of a vehicle. The track consists of a series of grousers or shoes A connected by means of links B.

The shoes are all identical and each one consists of a pair of spaced rods 5—5 adapted to be positioned transversely of the wheel 6, and rigidly connected at their ends by plates 7—7 and webs 8—8. The plates 7 are arranged perpendicularly to the rods and are provided with spaced apertures 9—9 for receiving the rods which are tangent to the under side of the plate. The mouth of each aperture is cut back to provide sufficient space for welding 10. The webs 8 are secured to the plates 7 and the rods by welding 11 and are arranged in a plane containing both rods so that they effectively increase the ground-bearing surface of the shoe and thereby reduce the unit pressure.

A wheel guide 12 positioned centrally of the rod 5 is formed of a bent plate having a narrow apex 13 and bases 14—14 of sufficient width to span the space between the rods. The guide is reinforced by a vertical web 15 and by a horizontal web 16 which fits between the rods 5 and provides a ground-bearing surface. The guide is secured in place on the rods by welding 17.

The plates 7 are provided at each end with an aperture 18 whereby the plates of adjoining shoes are connected by the links B which pass through the apertures.

In operation the rods 5 not only grip the resilient tires of the wheel but also act as cleats for engaging the ground. The track being of open construction will not become clogged with earth or snow.

I claim:

1. In a wheel track, a plurality of similar sections, each section comprising a pair of spaced rods, plates having apertures for receiving the ends of the rods and secured thereto, the rods being tangent to the under side of the plates, webs extending between the end portions of the rods, a guide secured centrally to the rods and having a web extending between the rods, and links connecting the plates of adjoining sections.

2. In a wheel track, a plurality of similar sections, each section comprising a pair of spaced rods, plates having apertures for receiving the ends of the rods and secured thereto, webs extending between the end portions of the rods, a guide secured centrally to the rods and having a web extending between the rods, and links connecting the plates of adjoining sections.

3. In a wheel track, a plurality of similar sections, each section comprising a pair of spaced rods, plates having apertures for receiving the ends of the rods and secured thereto, the rods being tangent to the under side of the plates, webs rigidly secured to the end portions of the rods on the inner sides of the plates, and links connecting the plates of adjoining sections.

4. In a wheel track, a plurality of similar sections, each section comprising a pair of spaced rods, plates having apertures for receiving the ends of the rods and secured thereto, webs rigidly secured to the end portions of the rods on the inner sides of the plates, and links connecting the plates of adjoining sections.

JOSEPH M. COLBY.